United States Patent [19]

Chapman

[11] 4,318,828
[45] Mar. 9, 1982

[54] ENHANCED OXIDE WHISKER GROWTH ON COLD-ROLLED ALUMINUM-CONTAINING STAINLESS STEEL FOIL

[75] Inventor: Lloyd R. Chapman, Powell, Tenn.

[73] Assignee: General Motors Corporation, Detroit, Mich.

[21] Appl. No.: 178,453

[22] Filed: Aug. 15, 1980

[51] Int. Cl.$^3$ .................... B01J 21/04; B01J 23/26; B01J 35/02; C23C 11/12
[52] U.S. Cl. ................. 252/465; 252/477 R; 148/6.35; 428/629
[58] Field of Search ............ 252/465, 477 R; 148/6.35; 428/629

[56] References Cited

U.S. PATENT DOCUMENTS 3,920,583  11/1975  Pugh ............................. 252/465
3,957,692  5/1976  Cairns et al. ..................... 252/465
4,096,095  6/1978  Cairns ............................ 252/465

OTHER PUBLICATIONS

Tien et al., "Mechanism of Oxide Adherence on Fe-25-Cr-Al(Y or Sc) Alloys", Metallurgical Transactions, vol. 3, Jun. 1972, pp. 1587-1599.

*Primary Examiner*—W. J. Shine
*Attorney, Agent, or Firm*—Douglas D. Fekete

[57] ABSTRACT

Alumina whiskers are grown on cold-rolled Fe-Cr-Al alloy foil by a two-step oxidation treatment. A bare metal surface is initially oxidized by heating while exposing to a predominantly inert atmosphere containing 0.1 volume percent oxygen or less. Thereafter, the surface is further oxidized by heating while exposing to air to grow the whiskers. In a preferred embodiment, whisker-covered foil is coated with a catalyst-bearing alumina layer and suitably wound into a structure for use in an automotive catalytic converter.

12 Claims, 4 Drawing Figures

Enhanced Oxide Whisker Growth on Cold-Rolled Aluminum-Containing Stainless Steel Foil

BACKGROUND OF THE INVENTION

This invention relates to the manufacture of an automotive catalytic converter comprising cold-rolled aluminum-containing steel foil having an oxide whisker-covered surface and carrying a catalyst-impregnated alumina coating. More particularly, this invention relates to growing dense alumina whiskers on a surface of cold-rolled Fe-Cr-Al or Fe-Cr-Al-Y alloy foil for tightly bonding an alumina coating.

U.S. patent application Ser. No. 098,075, filed Nov. 28, 1979, of common assignee-ownership, describes the manufacture of a monolith-type catalytic converter for treating automotive exhaust gases. The converter comprises a steel foil suitably wound to form a structure having gas-conveying passages. The foil is composed of an iron (Fe)-base alloy containing aluminum (Al), chromium (Cr) and preferably yttrium (Y); and commonly designated Fe-Cr-Al or Fe-Cr-Al-Y. The high temperature corrosion resistance of the stainless steel alloy, particularly the yttrium-containing alloy, make it preferred for converter use. The foil is fabricated by a metal peeling process and heated in air to grow high aspect alumina whiskers that substantially cover the surfaces. Thereafter, the whiskered surfaces are coated with a gamma alumina material and the coating is impregnated with a noble metal catalyst.

The alumina whiskers substantially improve adhesion of the alumina coating to the metal foil. This reduces spalling of the coating during converter use, which involves mechanical vibration and temperature cycling, the latter being particularly harmful because of the difference in thermal expansion between the alloy and the coating. The high density of alumina whiskers over substantially the entire surface is attributed to the high density of metal defects produced by the peeling process. In contrast, cold-rolling produces a foil having a relatively defect-free and smooth surface, which grows a flat or slightly nodular oxide. Even when subjected to the preferred whisker growing treatment for peeled foil, the cold-rolled foil forms only occasional, if any, whisker formations. However, Fe-Cr-Al or Fe-Cr-Al-Y alloy is difficult to obtain in billet form suitable for peeling, and it is desirable to manufacture the converter out of cold-rolled foil, which is readily commercially available.

Therefore, it is an object of this invention to provide a method for growing oxide whiskers on cold-rolled metal foil composed of a ferritic stainless steel alloy. The preferred alloy is predominantly iron and contains aluminum, chromium and optionally yttrium. The method comprises first treating the foil to produce a whisker-precursor surface and thereafter growing densely spaced whiskers that substantially cover the surface.

It is also an object of this invention to provide a non-peeled, wrought foil composed of Fe-Cr-Al alloy and having an integral, protective oxide layer that features densely spaced alumina whiskers and is capable of tightly bonding an applied coating. In a particularly useful aspect, a catalyst-bearing alumina coating is applied to the whisker-covered foil and the foil is formed into an automotive catalytic converter structure.

It is a more particular object of this invention to provide a method for preparing a Fe-Cr-Al alloy foil surface to bond a ceramic coating with improved adhesion, which method comprises initially heating the metal surface in an oxygen-deficient atmosphere and thereafter heating in an oxygen-rich atmosphere to grow high aspect alumina whiskers. The whiskers substantially cover the surface and tightly bond the subsequently applied coating.

It is a further object of this invention to provide an improved monolith-type catalytic converter for treating automotive exhaust gases and formed of a cold-rolled Fe-Cr-Al or Fe-Cr-Al-Y alloy foil. The foil comprises an oxidized surface substantially covered with high aspect, densely spaced alumina whiskers. An alumina material is applied to the surface and impregnated with an effective catalyst. The whiskers anchor the coating to reduce spalling during exhaust treatment.

BRIEF SUMMARY OF THE INVENTION

In a preferred embodiment, these and other objects are accomplished by a two-stage oxidation treatment of cold-rolled Fe-Cr-Al-Y alloy foil to produce a tightly adherent protective oxide surface layer consisting of high aspect alumina whiskers. The preferred alloy consists of 15 to 25 weight percent chromium, 3 to 6 weight percent aluminum, 0.3 to 1 percent yttrium and the balance iron. The bare metal surface is first heated to 875° C. to 925° C. while exposed to a predominantly inert gas atmosphere containing 0.1%, by volume, or less oxygen. Despite the very low oxygen content, an oxide film forms on the foil surface, as evidenced by a dull grey tint. Thereafter, the foil is heated in an oxygen-rich atmosphere, preferably air, to grow whiskers on the foil surface. Whisker growth is carried out at about 870° C. to 930° C. for eight hours or longer. The product whiskers substantially cover the foil surfaces.

The oxide layer formed by this invention tightly adheres to the metal substrate and protects the metal from further oxidation or corrosion, particularly at elevated temperatures. In addition, the whisker topography of the oxide layer provides tight bonding of an applied ceramic coating. The whiskers not only improve adhesion, but enable a thicker coating to be applied. For these reasons, the whisker-covered foil is preferred for manufacturing an improved automotive catalytic converter having a catalyst-impregnated gamma alumina coating that resists spalling during exhaust treatment. Furthermore, this invention enables the converter to be formed of cold-rolled foil, which is readily available.

DETAILED DESCRIPTION OF THE INVENTION

Figure 1:
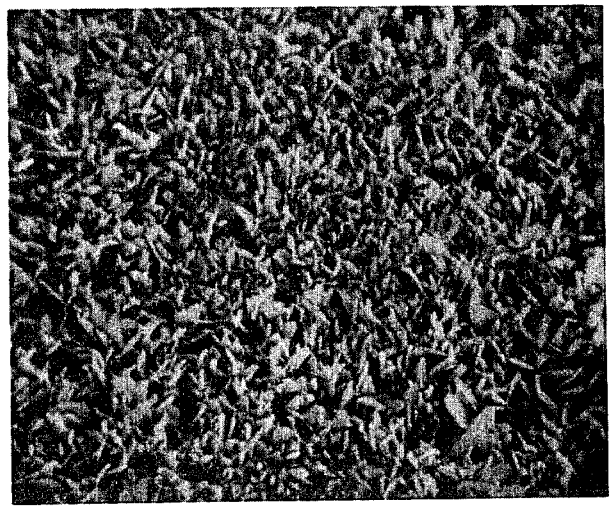
FIG. 1 is a photomicrograph taken using a scanning electron microscope and showing, at 5000× magnification, oxide whiskers formed on cold-rolled Fe-Cr-Al-Y foil that was initially heated in a carbon dioxide atmosphere for one minute to about 900° C. and thereafter heated in air for sixteen hours at about 900° C.

In a preferred embodiment, a wound foil structure for a monolith-type automotive catalytic converter is manufactured from cold-rolled Fe-Cr-Al-Y alloy foil that is commercially available. The foil is obtained from Allegheny Ludlum Industries in the form of a coiled strip that is 7.6 cm wide and 51 microns thick. The alloy consists of, by weight, 15% chromium, 4.5% aluminum, 0.3% yttrium and the balance iron. A light oil applied at the mill is ultrasonically cleaned off with trichlorotrifluoroethane. The clean foil exhibits a semihard surface finish having a typical metallic luster.

In accordance with this invention, the foil surface is pretreated to enhance whisker growth. This pretreatment is preferably carried out concurrent with an anneal of the metal to aid corrugation operations. In a strip operation, the foil passes through a furnace heated at 900° C. and having a bottled nitrogen atmosphere containing less than 0.1 volume percent oxygen. The desired low oxygen content is maintained by air leaking into the furnace. The foil is within the furnace chamber for about one minute and is at 900° C. for about 40 seconds. The pretreated surface displays a dull grey tint, indicative of a very thin oxide film.

The annealed foil is corrugated by passing between a pair of driven rollers carrying mating teeth arranged in a zig-zag pattern to form a zig-zag or herringbone corrugation pattern in the foil. The corrugations are about 0.76 mm in height and 1.78 mm in pitch. The segments of the zig-zag pattern are oriented about 10° from perpendicular to the foil edges and are about 1.25 cm long. An oil-base lubricant applied during corrugation is suitably cleaned away without affecting the pretreatment film, for example, by wiping with trichlorotrifluoroethane. After corrugating, the length of the foil was about 18 meters. During subsequent operations, the foil may be either loosely coiled to avoid metal-to-metal contact, particularly during furnace heating, or uncoiled and recoiled to provide access to the foil surface, particularly during coating operation. Preferably, coiling is carried out by folding and winding the foil, as hereinafter described, into substantially the shape of the desired catalytic converter structure.

The foil is heated for 8 hours at 930° C. in a circulating air atmosphere to grow a protective oxide layer comprising densely spaced alumina whiskers. The whiskers are readily observable with a scanning electron microscope and appear substantially similar to FIG. 1, although the pretreatment atmosphere and the growing conditions varied for the depicted whiskers. The whiskers are preferably on the order of three microns high and have a high aspect ratio, that is, the ratio of the height to the width is significantly greater than 1. X-ray analysis and analysis by secondary ion mass spectroscopy has demonstrated that the whiskers are essentially alpha alumina crystals. Yttrium, chromium and iron are present only in trace amounts significantly less than 1%. BET surface area analysis shows that a whisker-covered surface has a surface area about 12 times greater than the geometric area, or about 4 times greater than a conventional flat alumina coating. Another feature of the whiskers concerns a vapor-deposited gold coating of the type conventionally applied to prepare a sample for a scanning electron microscope. When the whisker-covered surface is gold coated, it appears velvety black, in marked contrast to the typical gold color exhibited by metallic or conventional smooth oxide surfaces. When an adhesive tape, such as masking tape, is applied to the surface, the tape sticks tightly to the whisker-covered surface and typically tears when being removed. In contrast, tape is readily peeled off conventional flat oxidized foil. Also, the mark of a felt-tipped pen on the whisker-covered surface tends to diffuse outwardly to form a blotch, in contrast to the neat mark left by the pen on conventional flat oxides.

The whiskered surface is primed by spraying an alumina gel formed by mixing 5.0 parts by weight colloidal alpha alumina monohydrate, $Al_2O_3 \cdot H_2O$, with 95 parts deionized water and adding concentrated nitric acid, $HNO_3$, to lower the pH below about 2.0. While still wet, the primed surface is spray-coated with a gamma alumina powder dispersed in a similar, but less viscous gel comprising 3.0 parts by weight colloidal alpha alumina monohydrate in 97 parts water and nitric acid-stabilized below pH 2.0. The gamma alumina powder preferably has a porosity greater than about 1 cc pores per gram and a surface area greater than about 100 square meters per gram. About 70% of the particles are sized less than 200 mesh and greater than 325 mesh, and the balance are smaller than 325 mesh. The preferred coating material is prepared by uniformly mixing 27 parts by weight of gamma alumina particles to about 100 parts gel, so that the dried coating is about 90% by weight gamma alumina. Although the colloidal alumina loses its alpha character in the gel, the gamma alumina survives as discrete particles having the desired high surface area. The first coat is air-dried and two to five additional coats of the particle-containing material are spray-applied and air-dried to produce a total coating thickness between 40 to 50 microns. The coating is calcined for four hours at 550° C. in air, during which noxious $NO_2$ fumes are driven off. The product coating is tightly adherent and suitable for impregnation with noble metal catalysts.

The gamma alumina coating is first impregnated with a combination of base metals including barium, which stabilizes gamma alumina and also a noble metal dispersion, and cerium, which enhances oxygen storage. An aqueous solution containing 0.03 g/ml barium nitrate and 0.05 g/ml cerium nitrate is sponge wiped onto both foil surfaces evenly at a rate of about 1 milliliter per gram of alumina coating. The foil is calcined for four hours at 550° C. The resulting coating contains about 2 weight percent barium in oxide form and about 2 weight percent cerium in oxide form.

The gamma alumina coating is then impregnated with two noble metal compositions. A first composition is prepared by volumetrically dissolving about 1.4 gram tetraamineplatinum(II) chloride and about 0.11 gram pentaaminerhodium(III) chloride in 125 ml water. The amine complex weights correspond to 0.8 gram (0.025 troy ounce) platinum and 0.04 gram (0.00125 troy ounce) rhodium. A second solution is similarly prepared by volumetrically dissolving about 0.76 gram tetraaminepalladium(II) chloride and about 0.11 gram pentaaminerhodium(III) chloride in 125 ml water, corresponding to 0.3 gram (0.01 troy ounce) palladium and 0.04 gram (0.00125 troy ounce) rhodium. The two solutions are applied to the foil surfaces using sponge applicators. The platinum-rhodium solution is applied evenly to one-half lengthwise of both sides of the foil. The palladium-rhodium solution is applied to the remaining halves. Thus, each side of the foil comprises a first half carrying a platinum-rhodium catalyst and a second half carrying the palladium-rhodium catalyst. The halves border along a transverse axis. The dual coating is dried and calcined for four hours at 550° C. in an atmosphere consisting of 4% by volume hydrogen and 96% nitrogen. Calcining destroys the amine complex salts and reduces the noble metals to their elemental and catalytically active state.

Figure 2:
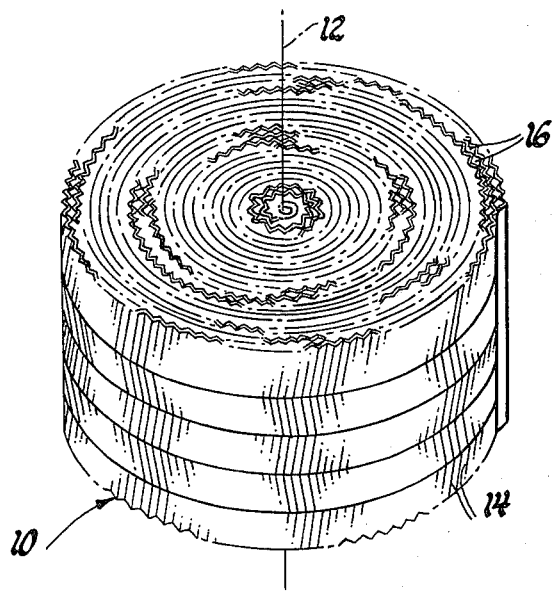
FIG. 2 is an elevational perspective view of a wound foil structure of a monolith-type automotive catalytic converter.

The catalyst-impregnated foil is folded and wound into a preferred catalytic converter structure 10, in FIG. 2. The foil is folded substantially in half lengthwise along the transverse axis 12 that divides the foil into halves carrying different catalyst compositions. Because of the oblique orientation of the zig-zag corrugations 14, they cannot nest upon folding but cross to form passages 16. The folded foil is then wound about the transverse axis 12; i.e., the bight of the fold, into generally cylindrical structure 10. During winding, as during folding, the zig-zag corrugations 14 cannot nest and instead cross to form additional passages 16. As seen in FIG. 2, passages 16 are the same whether formed during the folding or winding operations and provide for axial gas flow through structure 10. Because each side of the foil carries palladium-rhodium catalyst on one-half and platinum-rhodium catalyst on the other half, passages 16 are defined by facing foil surfaces carrying different catalyst compositions. Structure 10 is incorporated into an automotive exhaust gas system and employed for treating exhaust gas caused to flow therethrough.

The whiskers of this invention improve the adhesion of the catalyst-impregnated alumina coating to the cold-rolled foil and thereby reduce spalling during converter use. Because of the good foundation provided by the whiskers, the applied coating is preferably 4 to 5 times thicker than for conventional coatings applied to smooth oxides. The thicker coating provides more suitable catalyst sites and also reduces the harmful effects of some exhaust constituents on catalyst performance. In addition to the whisker topography, the oxide layer also protects the metal substrate from further oxidation or corrosion at the elevated temperatures associated with exhaust treatment.

Dense whisker growth on cold-rolled Fe-Cr-Al type alloy foil is fundamentally related to the initial oxidation of the foil. As received, commercial foil features a shiny metal surface that is substantially oxide free. Heating the bare metal surface in air oxidizes the surface, but forms, at best, only occasional whiskers. More particularly, it has been found that a whisker-precursor oxide film is not formed if the metal is first oxidized while exposed to an atmosphere containing more than about 0.2 volume percent oxygen, corresponding to a partial pressure of about 1.5 torr. The atmosphere preferably contains 0.1 volume percent (0.75 torr) or less oxygen. Despite the low oxygen content, an oxide layer forms on the metal surface and is typically evidenced by a dulling or hazing. The balance of the atmosphere is inert and may comprise nitrogen, hydrogen, carbon dioxide, argon or other noble gas. Impurities in bottled gas or air leakage into the furnace are typically sufficient to maintain the desired oxygen level. Chemisorbed oxygen on the foil may also be a significant source. It is noted that oxygen is formed at the furnace temperatures by the disassociation of water and, therefore, water entering the furnace must also be considered in controlling the oxygen level. Carbon dioxide also dissassociates at the elevated temperatures to produce oxygen, but in very small amounts. Even though a carbon dioxide atmosphere is estimated to comprise about 0.0003% molecular oxygen at 900° C., atmospheres derived from dry bottled carbon dioxide have been found to produce satisfactory whisker-precursor oxides. Hydrogen atmospheres of the type employed for bright annealing and having a dew point of about −60° C. have also been found to be suitable, although test results have been erratic. It is also believed that an effective whisker-precursor oxide may be formed in an evacuated chamber containing about 1.5 torr or less oxygen.

In the preferred embodiment, the foil was heated on a strip line for one minute at 900° C. In general, the temperature must be effective to oxidize the surface. Temperatures between about 875° and 925° C. are preferred. The foil is heated at a rate of at least 10° C. per minute and preferably much higher, as in the preferred embodiment where the foil reached 900° C. after about 20 seconds. At the preferred high temperatures, oxidation of the bare metal surface occurs rapidly and a few seconds is generally effective. Contained treatment does not apparently affect whisker growth. Although the pretreatment is conveniently carried out along with a strip annealing process, it is not necessary to combine these treatments. In one instance, cold-rolled foil was bright hydrogen annealed under conditions apparently insufficient to oxidize the surface. The foil was subsequently pretreated in a low-oxygen atmosphere and thereafter grew the desired dense whiskers.

Figure 3:
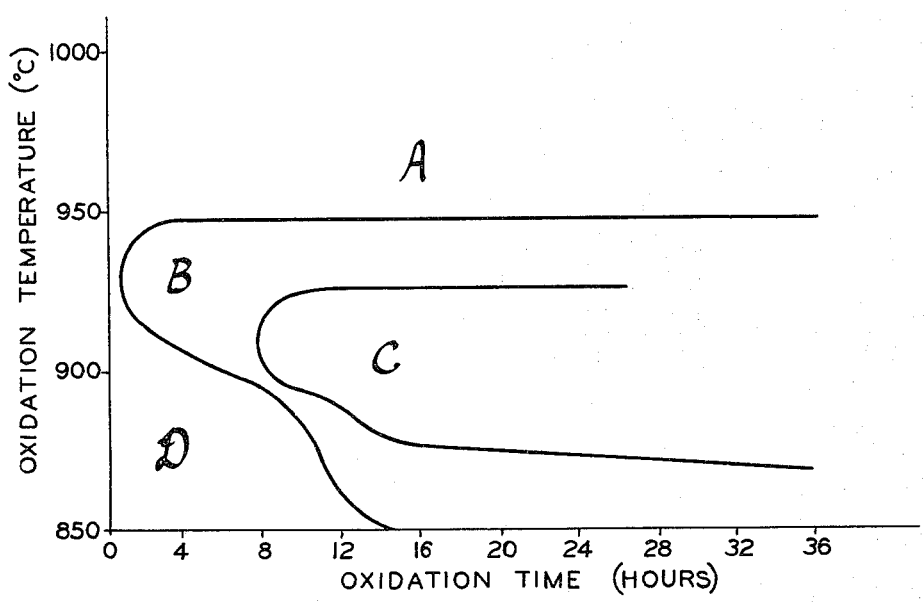
FIG. 3 is a graph of oxidation time versus oxidation temperature and showing region for growing oxide whiskers on Fe-Cr-Al-Y alloy foil.

After the formation of the whisker-precursor oxide, continued treatment in the low oxygen atmosphere does not grow whiskers, at least within a practical time. Thus, after the initial oxidation, the foil is heated in an oxygen-rich atmosphere, preferably air, to grow the whiskers. The growing time and temperature depends upon several factors, including the alloy composition. For yttrium-containing alloy, oxidation conditions suitable for whisker growth are depicted graphically in FIG. 3. No whisker growth is observed for the alloy when oxidized at a temperature greater than about 950° C., area A of FIG. 3. At the higher temperatures, it is theorized that yttrium ions migrate and thereby prevent aluminum ions from moving to the surface to form the whiskers. The resulting oxide is flat or slightly nodular. For oxidation temperatures of 950° C. or less, satisfactory whiskers are obtained after a suitable time, as indicated in area B. The time required depends upon the temperature and the desired whisker size. Whiskers are formed after about 0.5 hour at 930° C. or about 8 hours at 890° C., with longer times generally producing larger whiskers. The preferred high aspect whiskers are grown by oxidizing the foil between about 870° and 930° C. for greater than about 8 hours, as represented generally by area C. Whiskers produced by the conditions in area C are generally larger and have a high aspect ratio when compared to other whiskers in area B. Conditions represented by area D produce a substantially flatter oxide that provides unsatisfactory bonding of a coating.

The optimum whisker-growing conditions vary for Fe-Cr-Al alloys containing no yttrium. For example, a yttrium-free alloy consists of about 22.5 weight percent chromium, about 5.5 weight percent aluminum and the balance iron. The preferred high aspect whiskers are formed by heating in air at about 870° to 970° C. About 4 hours or longer are required at 950° C., and longer times up to about 24 hours are required at lower temperatures near 870° C. In general, suitable whiskers are produced after heating the alloy at a temperature between about 990° to 850° C. or lower for 0.5 hour or longer. Although higher growing temperatures are found in the absence of yttrium, no whisker growth has been observed at temperatures of 1000° C. or higher. Dense whisker growth has also been found for foils formed of Fe-Cr-Al alloys containing cerium instead of yttrium.

Figure 4:
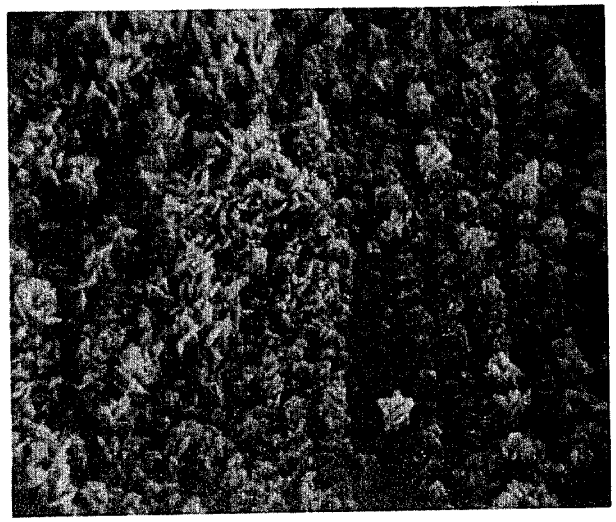
FIG. 4 is a photomicrograph taken using a scanning electron microscope and showing, at 5000× magnification, an oxide layer formed on cold-rolled Fe-Cr-Al-Y foil that was oxidized in air for 16 hours at about 900° C., without the pretreatment of this invention.

In an alternate embodiment, preferred high aspect alumina whiskers depicted in FIG. 1 were grown on clean cold-rolled Fe-Cr-Al-Y foil. The bare metal surface was initially heated for one minute in a dry carbon dioxide atmosphere. Thereafter, the foil was heated in air for 16 hours at about 900° C. As seen in FIG. 1, the surface was substantially covered with whiskers. In contrast, a sample of the cold-rolled foil was heated for 16 hours at 900° C. in air, without a low oxygen pretreatment. The resulting oxidized surface is depicted in FIG. 4 and is predominantly nodular, with only occasional scattered whisker-like formations, unsatisfactory for bonding an alumina coating.

The two-step whisker-growing method of this invention is particularly advantageous for growing whiskers on cold-rolled foil. The method is also suitable for growing whiskers on other types of Fe-Cr-Al alloys, including nonfoil surfaces. In addition, the method may also be carried out to enhance or assure dense whisker growth on peeled foils.

Although this invention has been described in terms of certain embodiments thereof, it is not intended to be limited to the above description but rather only to the extent set forth in the claims that follow.

The embodiments of the invention in which an exclusive property or privilege is claimed are defined as follows:

1. A method for forming oxide whiskers on an aluminum-containing ferritic stainless steel alloy surface, said method comprising
   oxidizing the alloy surface by heating while exposed to an atmosphere containing oxygen in an amount effectively low for forming a whisker-precursor oxide film on said surface, and thereafter
   further oxidizing said surface to grow whiskers.

2. A method for forming oxide whiskers on a surface of an iron-base alloy containing chromium, aluminum and optionally yttrium, said method comprising
   heating the bare alloy surface while exposing to an atmosphere containing oxygen in an amount not greater than 1.5 torr partial pressure to produce a whisker-precursor oxide film on said surface, and thereafter
   heating the surface while exposing to an atmosphere having a suitable oxygen content to grow whiskers.

3. A method for growing densely spaced alumina whiskers on a wrought foil composed of an iron-base alloy containing 15 to 25 weight percent chromium and 3 to 6 weight percent aluminum, said method comprising
   heating a bare foil surface while exposing to an atmosphere comprising predominantly a gas selected from the group consisting of carbon dioxide, nitrogen, hydrogen and noble gases and containing oxygen at a partial pressure not greater than 0.75 torr, and thereafter
   heating the surface at a suitable temperature between about 870° C. and 970° C. while exposing to air to grow whiskers on said surface.

4. A method for growing densely spaced, high aspect ratio alumina whiskers on cold-rolled foil composed of an alloy consisting essentially of 15 to 25 weight percent chromium, 3 to 6 weight percent aluminum, 0.3 to 1 weight percent yttrium and the balance iron, said method comprising
   (1) oxidizing a clean alloy surface by heating to between about 875° to 925° C. while exposed to an atmosphere comprising predominantly an inert gas and containing 0.1 volume percent or less oxygen, said oxidation forming a surface-dulling film capable of producing dense whisker growth, and
   (2) oxidizing further the surface formed by (1) by heating at between about 870° C. and 930° C. while exposed to air, said further oxidation being carried out for a time sufficient to grow densely spaced whiskers that substantially cover said surface.

5. A method for preparing a metal surface to receive a coating, said metal comprising a ferritic stainless steel alloy containing aluminum, said method comprising
   oxidizing the bare surface by heating while exposing to an atmosphere comprising oxygen in an amount sufficiently low to form a whisker-precursor film on said surface, and thereafter
   further oxidizing the surface to grow whiskers, the further oxidation being carried out by heating while exposing to an atmosphere comprising oxygen in an amount sufficiently high to grow whiskers, said whiskers substantially covering said surface and being capable of improving the adhesion of a subsequently applied coating.

6. A method for preparing a metal foil surface to receive a coating, said foil being formed of an iron-base alloy containing aluminum, chromium and optionally yttrium, said method comprising
   heating the bare alloy surface while exposing to an atmosphere containing oxygen in an amount not greater than 1.5 torr partial pressure to produce a whisker-precursor film on said surface, and
   heating the aforetreated surface while exposing to air to grow oxide whiskers that substantially cover the surface.

7. A method for preparing a cold-rolled metal foil to receive an alumina coating of the type suitable for supporting a catalyst for automotive exhaust gas treatment, said foil comprising 15 to 25 weight percent chromium, 3 to 6 weight percent aluminum, optionally 0.3 to 1.0 weight percent yttrium and the balance iron, said method comprising
   (1) heating a clean foil surface to a temperature between about 875° C. to 925° C. while exposed to an atmosphere comprising predominantly a gas selected from the group consisting of nitrogen, carbon dioxide, hydrogen and noble gases and containing oxygen in an amount not greater than 0.1 volume percent, and
   (2) heating the surface formed by (1) at a suitable temperature between about 870° C. and 970° C. while exposed to air to grow thereon high aspect ratio alumina whiskers that substantially cover said surface and improve the adhesion of a coating subsequently applied.

8. A metal foil formed of a ferritic stainless steel alloy containing aluminum and having a smooth metal surface that is relatively free of microstructural defects, which surface is substantially covered by densely spaced alumina whiskers.

9. A cold-rolled metal foil formed of an iron alloy containing chromium, aluminum and optionally yttrium and having a surface that is substantially covered by alumina whiskers.

10. A catalyst support comprising a cold-rolled metal substrate consisting of 15 to 25 weight percent chromium, 3 to 6 weight percent aluminum, 0.3 to 1.0 weight percent yttrium and the balance iron, and comprising a surface that is substantially covered by high aspect ratio alumina whiskers.

11. A method of manufacturing a foil having a surface that is substantially covered by high aspect ratio alumina whiskers, said method comprising, cold-rolling a ferritic stainless steel alloy containing 15 to 25 weight percent chromium, 3 to 6 weight percent aluminum, 0.3 to 1.0 weight percent yttrium and the balance iron to form a foil, annealing said foil by heating to between 875° C. to 925° C. for about one minute, said annealing being carried out while exposing a surface of the foil to an atmosphere comprising predominantly a gas selected from the group consisting of carbon dioxide, nitrogen, hydrogen and noble gases and containing less than about 0.1 volume percent oxygen, heating the foil in air at a temperature between about 870° C. to about 930° C. for a time sufficient to grow on said surface high aspect ratio alumina whiskers.

12. A cold-rolled metal foil formed of an aluminum-containing ferritic stainless steel having thereon a tightly adherent, integral oxide characterized by a dense whisker topography.

* * * * *